United States Patent [19]

Shannon

[11] 3,980,983

[45] Sept. 14, 1976

[54] MEASUREMENT AND PRESENTATION OF ACOUSTIC TARGET LENGTH AND ASPECT

[75] Inventor: James V. Shannon, Alexandria, Va.

[73] Assignee: The United States of America as represented by the Secretary of the Navy, Washington, D.C.

[22] Filed: Sept. 10, 1969

[21] Appl. No.: 857,636

[52] U.S. Cl. .............................................. 340/3 R
[51] Int. Cl.² ........................................... G01S 9/66
[58] Field of Search .............. 340/1, 3, 5 D; 343/11, 343/16 SD

[56] References Cited
UNITED STATES PATENTS
3,174,127  3/1965  Haslett .................................. 340/3

Primary Examiner—Richard A. Farley
Attorney, Agent, or Firm—Richard S. Sciascia; Arthur A. McGill; Prithvi C. Lall

[57] ABSTRACT

The length ($l$) and aspect angle ($\theta$) of an undersea target is determined by irradiating the target with a short sonar pulse and processing the echo pulse. Detection circuits operate upon the latter to provide the following target parameters: nearest-point range, $R_1$; farthest-point range, $R_2$, angle between transducer center line and nearest-range line, $\phi_1$; angle between center line and farthest range line, $\phi_2$. A computer is then programmed to operate upon these values and provide the length of the target ($l$) and its aspect angle ($\theta$) as outputs. The outputs can be visually displayed on a CRT or on meter dials. The computer solves simple geometrical relationships to provide these outputs.

10 Claims, 8 Drawing Figures

ASPECT ANGLE DERIVATIONS $\theta = \gamma + 90°$ $\theta = 180 + (\gamma + 90)$ $\theta = 360 - (\gamma + 90)$ $\theta = 180 - (\gamma + 90)$ INVENTOR.
JAMES V. SHANNON
BY Philip Schneider
L. B. Appleton
ATTORNEYS

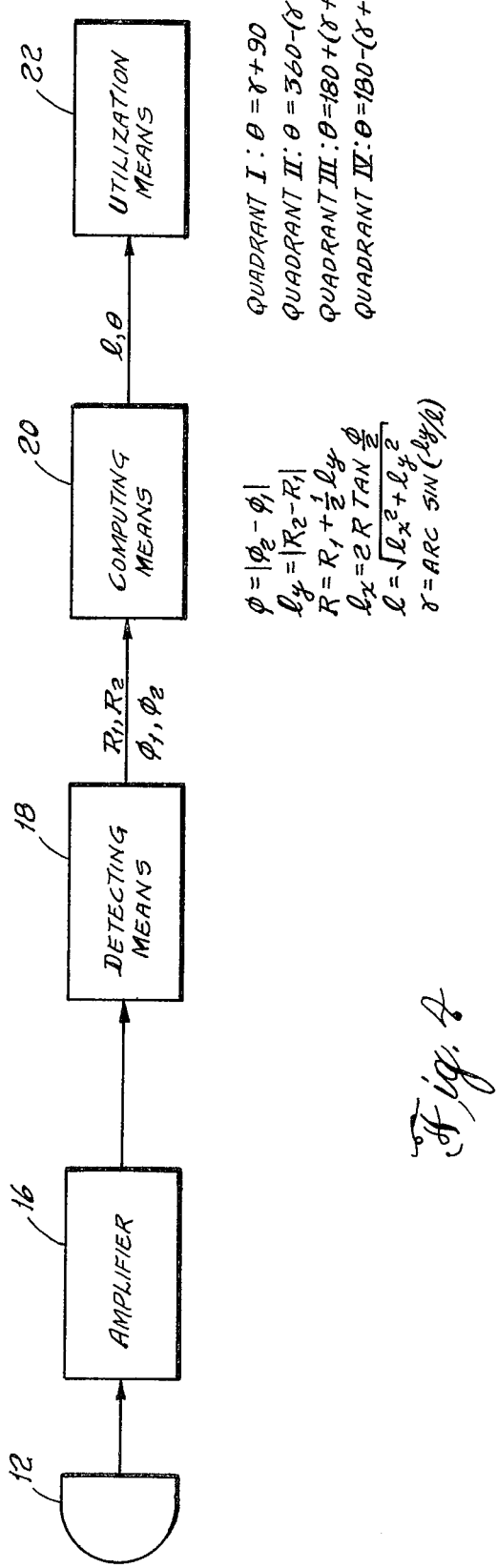

MEASUREMENT AND PRESENTATION OF ACOUSTIC TARGET LENGTH AND ASPECT

This invention relates to a method and means for determining the length and aspect angle of a target.

In anti-submarine warfare, it is important to be able to determine whether a received echo is a submarine, a countermeasure or an extraneous target. The length of the target, if obtainable, would constitute an important means of making such an identification since submarines generally range about 300 feet in length while countermeasure objects are generally quite small.

Accordingly, an object of this invention is to permit the measurement of the length and aspect angle of a target which is being illuminated by a pulse of energy, especially by a pulse of sonic energy.

The objects and advantages of the present invention are accomplished by irradiating a target with a short pulse of energy and deriving from the echo pulse certain parameters of the geometrical relationship between the target and the transducer. The parameters are the nearest-point range ($R_1$), the farthest-point range ($R_2$) and the angles from the center line of the transducer to the nearest-range and farthest-range lines ($\phi_1$ and $\phi_2$, respectively). A computer is then programmed to solve mathematical equations which provide the values of the length of the object ($l$) and its aspect angle relative to the line of sight from the transducer ($\theta$).

Other objects, advantages and novel features of the invention will become apparent from the following detailed description of the invention when considered in conjunction with the accompanying drawings wherein.

Figure 5:
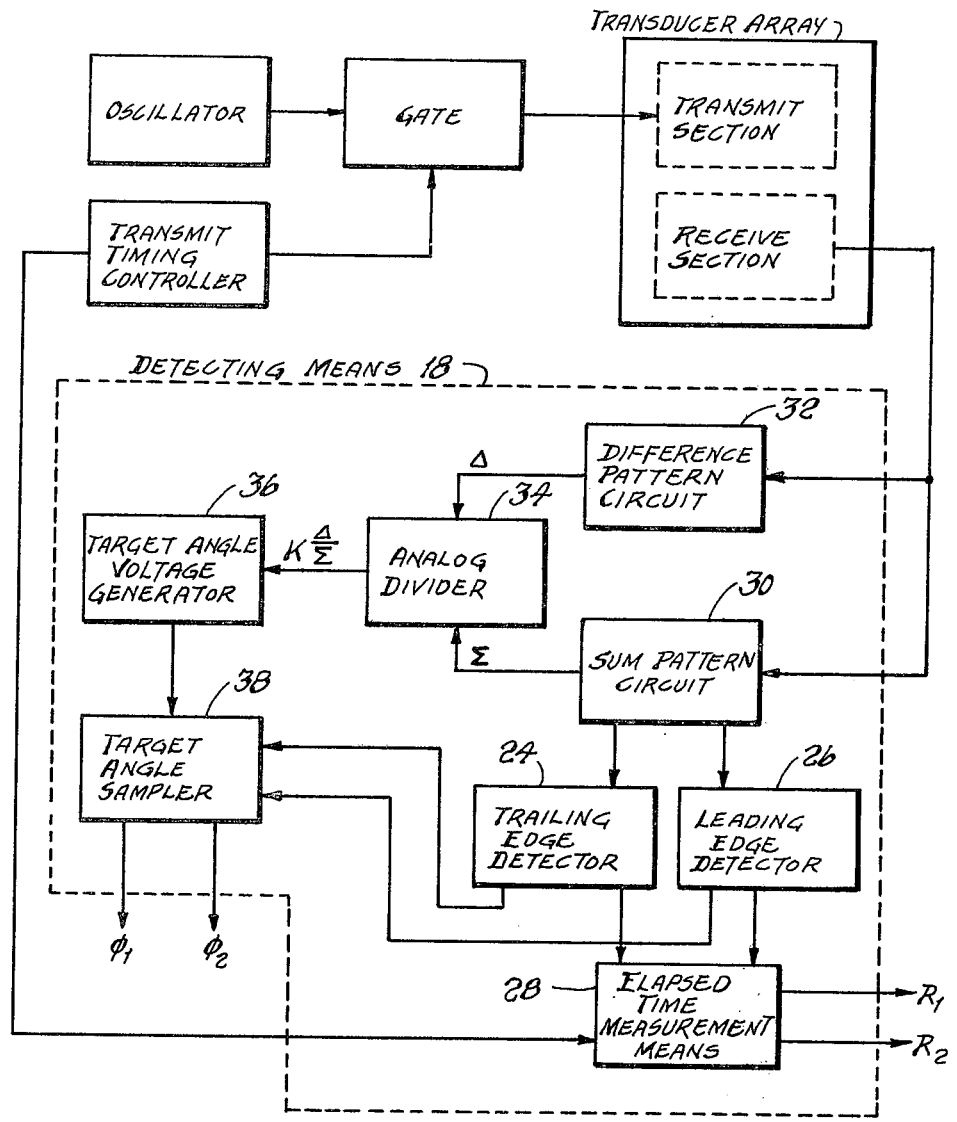

FIGS. 3a–d are diagrams illustrating the various possibilities which must be considered in deriving the aspect angle;

FIG. 4 is a block diagram of an embodiment of the invention and includes as legend the relationships which are solved by the computer to provide the length and aspect angle of the target; and FIG. 5 is a block diagram showing one means of implementing the detecting means of FIG. 4.

Figure 1:
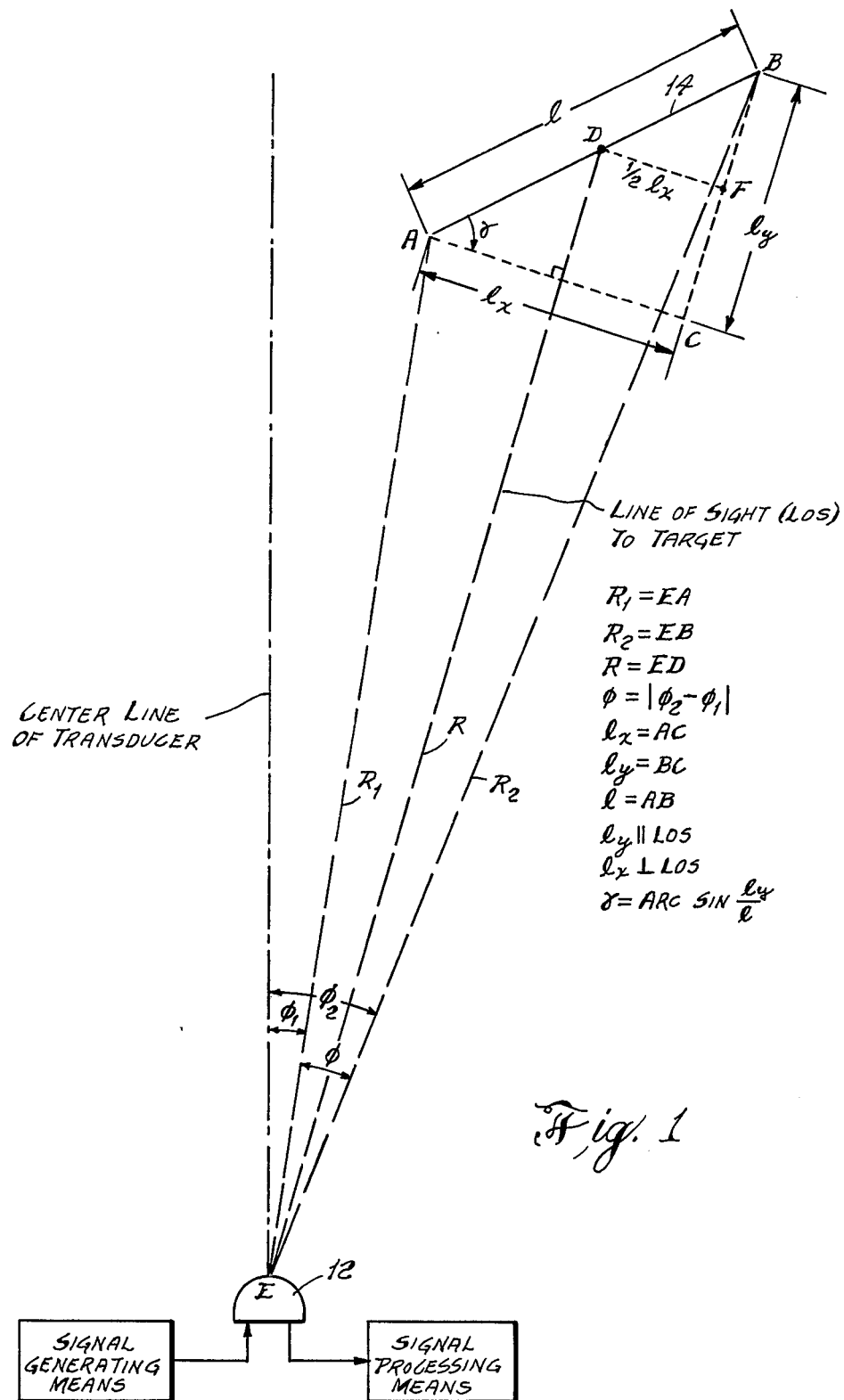
FIG. 1 is a diagram illustrating the geometrical relationships involved in calculating the length and aspect angle of an illuminated target.

FIG. 1 illustrates the geometrical relationship between the source of irradiating energy 12 (which shall hereinafter be considered to be a sonar transducer or transducer array) and a target 14, such as a submarine.

The transducer 12 projects a pulse of sonic energy through the water, the pulse being of short duration, e.g., 1.5 to 2.0 milliseconds. Thus, if the boat has a first quadrant position relative to the search sonar and is about 300 feet long, and if the line of sight from the sonar to the nearest point of the boat is taken as the 270° axis line, the boat can turn in aspect from the 90° to approximately the 17° line before the length of the return echo becomes as small as 20 milliseconds, or ten times greater than the irradiating pulse. The irradiating pulse is considered a short pulse under these conditions. Actually, the emitted pulse can be greater than 1/10 the echo duration in practice and results will still be satisfactory.

A return or echo is first received from the nearest point A of the target 14, whose length is $l$. The range of the nearest point is $R_1$. The nearest-point range, $R_1$, is found by taking the difference in time from the time the search pulse is sent out ($t_0$) to the time the first part of the echo is received ($t_1$) and multiplying it by the average velocity of sound in the water ($v_s$) in the following relation:

$$R_1 = \tfrac{1}{2}(t_1 - t_0)v_s \tag{I}$$

The echo continues until the farthest point of the target, B, is irradiated by the propagated pulse. The range of the farthest point is $R_2$. This range is found by taking the difference in time from the time the search pulse is sent out ($t_0$) to the time the last part of the echo is received ($t_2$) and multiplying it by the average velocity of sound in the water ($v_s$) in the following relation:

$$R_2 = \tfrac{1}{2}(t_2 - t_0)v_s \tag{II}$$

The angles which are made by the lines along which the nearest and farthest ranges, $R_1$ and $R_2$, of the target lie with respect to the center line of the sonar transducer means 12 are $\phi_1$ and $\phi_2$, respectively. (These lines may be called the nearest and farthest range lines, respectively.) The angle between the two range lines is $\phi$. Thus:

$$\phi = |\phi_2 - \phi_1| \tag{III}$$

These angles are the angles at which the first and last echoes are received from the target and are obtainable from the conventional sonar equipment, as are the nearest-point and farthest-point ranges, $R_1$ and $R_2$. The angles $\phi_1$ and $\phi_2$ will hereinafter also be referred to as the nearest-range and farthest-range angles, respectively.

The projection of the length of the target along the line of sight (LOS) to the target is $l_y$. The projection of the target along a line traversing the LOS perpendicularly is $l_x$. It is apparent that:

$$l = \sqrt{l_x^2 + l_y^2} \tag{IV}$$

The longitudinal length vector, $l_y$, is the difference between the range vectors, i.e., $$l_y \approx |R_2 - R_1| \tag{V}$$

The average range, R, of the target is $$R = R_1 + \frac{|R_2 - R_1|}{2} \approx R_1 + \frac{1}{2}l_y \tag{VI}$$

These dimensions are only approximate since $l_y$ is only an approximation of $|R_2 - R_1|$. The error is small for the ranges at which sonar contacts with submarines are usually made.

Now the azimuthal length vector, $l_x$, can be calculated from the formula $$\tfrac{1}{2}l_x = R \tan \tfrac{\phi}{2} \tag{VII}$$

Note that $R_1 = EA$, $R_2 = EB$, $R = ED$, $l_x = AC$, $l_y = BC$, $l = AB$, $l_y$ is parallel to the LOS (or is the projection of $l$ along the LOS) and $l_x$ is normal to the LOS (or is the projection of $l$ upon a line normal to the LOS).

Figure 2:
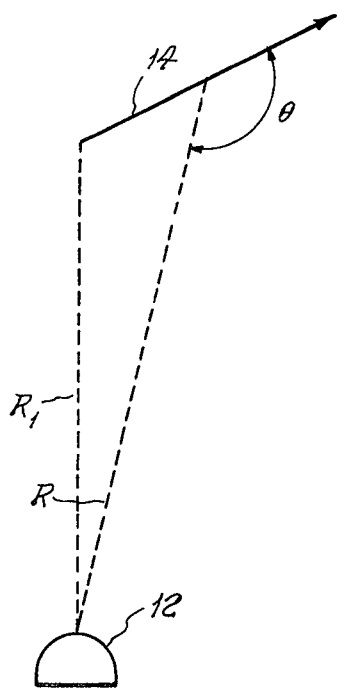
FIG. 2 is a diagram defining the aspect angle.

The aspect angle, $\theta$, is the clockwise angle the target forms with the line to the sonar (LOS), measured from the bow of the target. Thus, in FIG. 2, the bow of the target 14 is designated by an arrow head and the aspect angle, $\theta$, is measured from the target, $l$, in a clockwise direction to the average range line, R. Since the range is quite long compared to the target length, the angle $\phi$ is quite small and the aspect angle, $\theta$, could be measured to the line $R_1$, the nearest range, within an acceptable approximation.

FIGS. 3a–d illustrate the four possibilities which can occur with respect to the way in which the bow of a ship can lie relative to the position of the irradiating transducer 12. Thus, in FIG. 3a, which represents a first quadrant target, the stern is nearer and the ship is moving to the right. The aspect angle calculation is $$\theta = \gamma + 90° \qquad (VIII)$$

where $\gamma$ is the least angle from the bow of the targent to the normal to the line of sight.

Figure 3A:
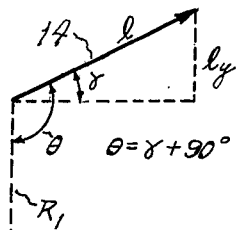
Figure 3B:
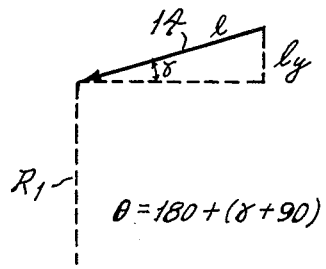

In FIG. 3b, which represents a third quadrant target, the bow is nearer and the ship is moving to the left. The aspect angle calculation is $$\theta = 180° + (\gamma + 90°) \qquad (IX)$$

Figure 3C:
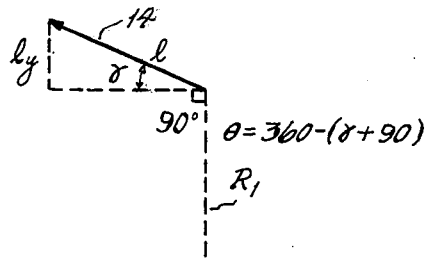

In FIG. 3c, which represents a second quadrant target, the stern is nearer and the ship is moving to the left. The aspect angle calculation is $$\theta 360° - (\gamma + 90°) \qquad (X)$$

Figure 3D:
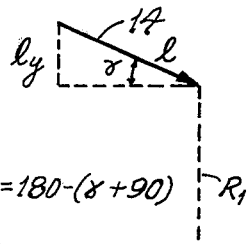

In FIG. 3d, which represents a fourth quadrant target, the bow is nearer and the ship is moving to the right. The aspect angle calculation is $$\theta = 180° - (\gamma + 90°) \qquad (XI)$$

The angle $\gamma$ is obtained from the simple trigonometric relationship $$\gamma = \arcsin \frac{l_y}{l} \qquad (XII)$$

Before the proper formula for the calculation of aspect angle can be selected for use, two pieces of information must be known. The first is whether the bow or stern of the target is nearer and the second is the direction of motion of the target. These bits of information can be obtained from the dead reckoning trace (DRT) which is customarily made when a target is acquired by a sonar. The DRT can be made by hand, or by automatic equipment. The computer of the present invention is set for the correct quadrant by setting in the previously mentioned pieces of information and the quadrant formulas are defined in the computer program.

FIG. 4 is a block diagram of means which can be employed to implement this invention and includes as legend the relationships which are solved by the computer to provide the length and aspect angle of the target. The echo is fed from the transducer 12 through amplifying means 16, if necessary, to detecting means 18 which provides outputs corresponding to ranges $R_1$ and $R_2$ and angles $\phi_1$ and $\phi_2$.

The outputs of the detecting means 16 are fed to computing means 20, a computer which is designed and programmed to solve the relationships shown in FIG. 4 and thereby provide the length $l$ and aspect angle $\theta$ of the target. The design of the circuits employed in the computer 20 is well within the competence of any skilled computer engineer.

The outputs $l$ and $\theta$ are fed to a utilization means 22 which can be any means for displaying or recording the output values. For example, a digital-to-analog signal converter in series with a cathode ray tube or a pair of electrical meters may be used. If the meters were used, the readings on the meters would indicate length and aspect angle values.

FIG. 5 is a block diagram showing a means for implementing the detecting means block 18 of FIG. 4, by a sum and difference signal comparison approach similar to that used in the well-known monopulse radar system. The nearest and farthest ranges $R_1$ and $R_2$ are obtained through conventional measurements and means, namely, the circuit blocks labelled trailing edge detector 24, leading edge detector 26 and elapsed time measurement means 28. The ranges are, of course, related to the propagation time of the signal and the echoes through the water.

The transducer array is connected through the sum pattern circuit 30 and the difference pattern circuit 32 to provide a sum signal, $\epsilon$ (with maximum sensitivity dead ahead) and a difference signal, $\Delta$ (with maximum sensitivity a few degrees each side of the transducer array axis and a null dead ahead). For small target angles, the ratio of the amplitude of the target signal received on the difference field pattern to the amplitude of the signal received on the sum field pattern is essentially proportional to the target angle. Thus, by dividing the difference signal, $\Delta$, by the sum signal, $\epsilon$, in an analog divider 34, a signal proportional to the target angle is obtained.

This signal is used as an input to the target angle voltage generator 36 whose output is fed to the target angle sampler 38 which samples its input at the times at which the leading and trailing edge detectors detect the start and end of the target echo. This sampling technique provides signals corresponding to the nearest and farthest range angles, $\phi_1$ and $\phi_2$.

I claim:

1. A method for measuring the length of a longitudinal object where said object is irradiated by a short pulse of energy from a transducer comprising the steps of:

receiving an echo pulse from said object;
    utilizing said echo pulse to obtain the values of the nearest-point range ($R_1$) of said object, the farthest-point range ($R_2$), the angle from the center line of the transducer to the nearest-range line ($\phi_1$), and the angle from the center line of the farthest-range line ($\phi_2$);
    feeding these values to a computer; and
    utilizing said computer to operate upon these variables ($R_1$, $R_2$, $\phi_1$, and $\phi_2$) and obtain the angle between the nearest and farthest range lines ($\phi$), the average range (R), the projected length of the object on the line of sight ($l_y$), the projected length of the object on the normal to the line of sight ($l_x$), and the length of the object ($l$).

2. A method as in claim 1, including the step of converting said length value into a physically identifiable form.

3. A method for measuring the length of a longitudinal object where said object is irradiated by a short pulse of energy from a transducer comprising the steps of:

receiving an echo pulse from said object;

utilizing said echo pulse to obtain energy values corresponding to the nearest-point range ($R_1$) of said object, the farthest-point range ($R_2$), the angle from the center line of the transducer to the nearest-range line ($\phi_1$), and the angle from the center line to the farthest-range line ($\phi_2$);

feeding these energy values to a computer;

utilizing said computer to operate upon said energy values ($R_1$, $R_2$, $\phi_1$ and $\phi_2$) and obtain energy values corresponding to the angle between the nearest-range and farthest-range lines ($\phi$), the average range (R), the projected length of the object on the line of sight ($l_y$), the projected length of the object on the normal to the line of sight ($l_x$), and the length of the object ($l$); and converting said length value ($l$) into a physically identifiable form, wherein said irradiating pulse is a sonar pulse and said energy values are voltage amplitudes.

4. A method for measuring the length of a longitudinal object where said object is irradiated by a short pulse of energy from a transducer comprising the steps of:

receiving an echo pulse from said object;

utilizing said echo pulse to obtain energy values corresponding to the nearest-point range ($R_1$) of said object, the farthest-point range ($R_2$), the angle from the center line of the transducer to the nearest-range line ($\phi_1$), and the angle from the center line to the farthest-range line ($\phi_2$);

feeding these energy values to a computer;

utilizing said computer to operate upon said energy values ($R_1$, $R_2$, $\phi_1$ and $\phi_2$) and obtain energy values corresponding to the angle between the nearest-range and farthest-range lines ($\phi$), the average range (R), the projected length of the object on the line of sight ($l_y$), the projected length of the object on the normal to the line of sight ($l_x$), and the length of the object ($l$); and converting said length value ($l$) into a physically identifiable form, wherein said energy values are computed from the following mathematical relationships:

$$\phi = |\phi_2 - \phi_1|$$

$$l_y \approx |R_2 - R_1|$$

$$R \approx R_1 + \tfrac{1}{2} l_y$$

$$l_x = 2R \tan \tfrac{\phi}{2}$$

$$l = \sqrt{l_x^2 + l_y^2}.$$

5. A method as in claim 4, wherein the means for operating upon the received echo and the computer are both electronic means.

6. A method for measuring the length of a longitudinal object where said object is irradiated by a short pulse of energy from a transducer comprising the steps of:

receiving an echo pulse from said object;

utilizing said echo pulse to obtain the values of the nearest-point range ($R_1$) of said object, the farthest-point range ($R_2$), the angle from the center line of the transducer to the nearest-range line ($\phi_1$), and the angle from the center line to the farthest-range line ($\phi_2$);

feeding these values to a computer; and utilizing said computer to operate upon these variables ($R_1$, $R_2$, $\phi_1$ and $\phi_2$) and obtain the angle between the nearest and farthest range lines ($\phi$), the average range (R), the projected length of the object on the line of sight ($l_y$), the projected length of the object on the normal to the line of sight ($l_x$), the length of the object ($l$), the angle ($\gamma$) representing the least angle between the bow of the object and the normal to the line of sight between the transducer and the target, and the aspect angle ($\theta$).

7. A method as in claim 6, including the step of converting said length and aspect angle values to a physically identifiable form.

8. A method for measuring the length of a longitudinal object where said object is irradiated by a short pulse of energy from a transducer comprising the steps of:

receiving an echo pulse from said object;

utilizing said echo pulse to obtain energy values corresponding to the nearest-point range ($R_1$) of said object, the farthest-point range ($R_2$), the angle from the center line of the transducer to the nearest-range line ($\phi_1$), and the angle from the center line to the farthest-range line ($\phi_2$);

feeding these energy values to a computer;

utilizing said computer to operate upon said energy values ($R_1$, $R_2$, $\phi_1$ and $\phi_2$) and obtain energy values corresponding to the angle between the nearest-range and farthest-range lines ($\phi$), the average range (R), the projected length of the object on the line of sight ($l_y$), the projected length of the object on the normal to the line of sight ($l_x$), the length of the object ($l$), and angle ($\gamma$) representing the least angle between the bow of the object and the normal to the line of sight between the transducer and the target, and the aspect angle ($\theta$); and converting the length ($l$) and aspect angle ($\theta$) values into a physically identifiable form, wherein said irradiating pulse is a sonar pulse and said energy values are voltage amplitudes.

9. A method for measuring the length of a longitudinal object where said object is irradiated by a short pulse of energy from a transducer comprising the steps of:

receiving an echo pulse from said object;

utilizing said echo pulse to obtain energy values corresponding to the nearest-point range ($R_1$) of said object, the farthest-point range ($R_2$), the angle from the center line of the transducer to the nearest-range line ($\phi_1$), and the angle from the center line to the farthest-range line ($\phi_2$);

feeding these energy values to a computer;

utilizing said computer to operate upon said energy values ($R_1$, $R_2$, $\phi_1$ and $\phi_2$) and obtain energy values corresponding to the angle between the nearest-range and farthest-range lines ($\phi$), the average range (R), the projected length of the object on the line of sight ($l_y$), the projected length of the object on the normal to the line of sight ($l_x$), the length of the object ($l$), the angle ($\gamma$) representing the least angle between the bow of the object and the normal to the line of sight between the transducer and the target, and the aspect angle ($\theta$); and convverting the length ($l$) and aspect angle ($\theta$) values into a physically identifiable form, wherein said energy values are computed from the following mathematical relationships:

$$\phi = |\phi_2 - \phi_1|$$

$$l_y \approx |R_2 - R_1|$$

$$R \approx R_1 + \tfrac{1}{2} l_y$$

$$l_x = 2R \tan \tfrac{\phi}{2}$$

$$l = \sqrt{l_x^2 + l_y^2}$$

$$\gamma = \arcsin\left(\tfrac{l_y}{l}\right)$$

quad. I:      $\theta = \gamma + 90°$
quad. II:     $\theta = 360° - (\gamma + 90°)$
quad. III:    $\theta = 180° + (\gamma + 90°)$
quad. IV:    $\theta = 180° - (\gamma + 90°)$.

10. A method as in claim 9, wherein the means for operating upon the received echo and the computer are both electronic means.

\* \* \* \* \*